US012736013B2

(12) United States Patent
Henning et al.

(10) Patent No.: US 12,736,013 B2
(45) Date of Patent: Sep. 15, 2026

(54) SYSTEMS AND METHODS FOR FILLING A FUEL MANIFOLD OF A GAS TURBINE ENGINE

(71) Applicant: Pratt & Whitney Canada Corp., Longueuil (CA)

(72) Inventors: Andrea Henning, London (CA); Philippe Beauchesne-Martel, Brossard (CA); Louis Duranleau-Hendrickx, Montreal (CA); Poi Loon Tang, Coquitlam (CA); Ian Dizon, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/915,855

(22) Filed: Oct. 15, 2024

(65) Prior Publication Data

US 2026/0104014 A1 Apr. 16, 2026

(51) Int. Cl.

| | |
|---|---|
| ***F02C 7/22*** | (2006.01) |
| ***F02C 7/26*** | (2006.01) |
| ***F02C 9/42*** | (2006.01) |
| *B64D 31/06* | (2006.01) |

(52) U.S. Cl.

CPC ................ *F02C 9/42* (2013.01); *F02C 7/222* (2013.01); *F02C 7/26* (2013.01); *B64D 31/06* (2013.01)

(58) Field of Classification Search

CPC . B64D 31/06; F02C 7/26; F02C 7/222; F02C 9/42

See application file for complete search history.

(56) References Cited

U.S. PATENT DOCUMENTS

| | | | | |
|---|---|---|---|---|
| 9,541,005 | B2 | 1/2017 | Lamarre | |
| 11,555,456 | B2 | 1/2023 | Morenko et al. | |
| 11,760,500 | B2 | 9/2023 | Tang et al. | |
| 2005/0011197 | A1* | 1/2005 | Tuttle | F02C 7/22 60/773 |
| 2016/0069276 | A1* | 3/2016 | Djelassi | F02C 9/26 60/776 |
| 2016/0169120 | A1 | 6/2016 | Van et al. | |

(Continued)

FOREIGN PATENT DOCUMENTS

| | | | |
|---|---|---|---|
| CA | 2791563 | C | 10/2019 |
| FR | 2969703 | A1 | 6/2012 |

(Continued)

OTHER PUBLICATIONS

European Search Report dated Mar. 18, 2026, in connection with European Patent Application No. 25208991.7, 8 pages.

*Primary Examiner* — Rodolphe Andre Chabreyrie

(57) ABSTRACT

In response to exiting from a non-full non-filling state of a secondary manifold of a gas turbine engine, the method of filling the secondary fuel manifold of the engine includes: setting at least one engine schedule limit based on a measured value of a scheduling parameter that is within a first range that corresponds to a non-full state of the secondary fuel manifold. The method includes determining whether the filling of the secondary fuel manifold is completed. The method includes adjusting the at least one engine schedule limit to control at least one operational parameter of the engine, in response to a determination that the filling of the secondary fuel manifold is completed.

20 Claims, 7 Drawing Sheets

(56) References Cited

U.S. PATENT DOCUMENTS

| | | | | |
|---|---|---|---|---|
| 2016/0201919 | A1 | 7/2016 | Chalaud | |
| 2021/0025332 | A1 | 1/2021 | Morenko et al. | |
| 2021/0025333 | A1 | 1/2021 | Morenko et al. | |
| 2021/0139158 | A1 * | 5/2021 | Tang | B64D 37/00 |

FOREIGN PATENT DOCUMENTS

| | | | |
|---|---|---|---|
| RU | 2258149 | C1 | 8/2005 |
| RU | 2315883 | C1 | 1/2008 |
| RU | 2568015 | C1 | 11/2015 |
| RU | 2786967 | C1 | 12/2022 |

* cited by examiner

SYSTEMS AND METHODS FOR FILLING A FUEL MANIFOLD OF A GAS TURBINE ENGINE

TECHNICAL FIELD

This disclosure relates generally to single or multi-engine system for an aircraft. More specifically, this disclosure relates to a system and method for filling a fuel manifold of a gas turbine engine.

BACKGROUND

Some aircraft include a multi-engine system, for example, a rotorcraft. A helicopter is an example of a rotorcraft. Exiting a low-powered standby mode of an engine, or starting an engine either on the ground or in-flight, requires filling of a gas manifold and nozzles before fuel reaches the combustor and starts to combust. If fuel is injected into the manifold too quickly, an over fuel spike into the combustor may cause the engine compressor to surge. However, it may be desired to fill the manifold quickly in order to bring the engine into a fully operational mode quickly. Therefore, improvements are needed.

SUMMARY

This disclosure relates to systems and methods for filling a fuel manifold of a gas turbine engine.

In some examples, a method includes, in response to exiting a non-full non-filling state of an engine in which a secondary fuel manifold of the engine is at least partially empty and is not receiving fuel at a fuel flow that exceeds a threshold filling fuel flow, initiating filling the secondary fuel manifold of the engine, including: setting at least one engine schedule limit based on a measured value of a scheduling parameter that is within a first range that corresponds to a non-full state of the secondary fuel manifold. The method includes determining whether the filling of the secondary fuel manifold is completed. The method includes adjusting the at least one engine schedule limit to control at least one operational parameter of the engine, in response to a determination that the filling of the secondary fuel manifold is completed.

In some examples, an electronic device includes a processor configured to, in response to exiting a non-full non-filling state of an engine in which a secondary fuel manifold of the engine is at least partially empty and is not receiving fuel at a fuel flow that exceeds a threshold filling fuel flow, initiate filling a secondary fuel manifold of the engine. To initiate filling the secondary fuel manifold of the engine, the processor is configured to set at least one engine schedule limit based on a measured value of a scheduling parameter that is within a first range that corresponds to a non-full state of the secondary fuel manifold. The processor is configured to determine whether the filling of the secondary fuel manifold is completed. The processor is configured to adjust the at least one engine schedule limit to control at least one operational parameter of the engine, in response to a determination that the filling of the secondary fuel manifold is completed.

In some examples, a non-transitory machine-readable medium may include instructions that, when executed, cause at least one processor to, in response to exiting a non-full non-filling state of an engine in which a secondary fuel manifold of the engine is at least partially empty and is not receiving fuel at a fuel flow that exceeds a threshold filling fuel flow, initiate filling the secondary fuel manifold of the engine. To initiate filling a secondary fuel manifold of the engine, the non-transitory machine-readable medium may also include instructions that, when executed, cause the at least one processor to set at least one engine schedule limit based on a measured value of a scheduling parameter that is within a first range that corresponds to a non-full state of the secondary fuel manifold. The non-transitory machine-readable medium may further include instructions that when executed cause the at least one processor to determine whether the filling of the secondary fuel manifold is completed. The non-transitory machine-readable medium may further include instructions that, when executed, cause the at least one processor to adjust the at least one engine schedule limit to control at least one operational parameter of the engine in response to a determination that the filling of the secondary fuel manifold is completed.

Any single one or any combination of the following features may be used with the any of the above examples. In some examples, the at least one engine schedule limit includes a first engine schedule limit and a second engine schedule limit. The scheduling parameter includes a first scheduling parameter and a second scheduling parameter different from the first scheduling parameter. The setting of the at least one engine schedule limit based on the measured value of the scheduling parameter that corresponds to the non-full state of the secondary fuel manifold includes: setting the first engine schedule limit based on a measured value of the first scheduling parameter; and setting the second engine schedule limit based on a measured value of the second scheduling parameter.

In some examples, the exiting the non-full non-filling state of the engine includes at least one of: starting the engine; relighting the engine; exiting an Asymmetric Operating Regime (AOR) mode of a multi-engine system that includes the engine; exiting a low-fuel mode; or recovering from fuel flow below a cracking point of a flow divider valve.

In some examples, the determination that the filling of the secondary fuel manifold is completed includes determining a first duration of time elapsed from the initiation of the filling of a secondary fuel manifold. In response to the determination that the filling of the secondary fuel manifold is completed, the at least one engine schedule limit can be maintained at the setting that is based on the measured value of the scheduling parameter that is within a first range for a second duration of time that follows the elapse of the first duration of time.

In some examples, the determination that the filling of the secondary fuel manifold is completed comprises determining the measured value of the scheduling parameter is no longer within the first range. The adjusting of the at least one engine schedule limit can be based on the measured value of the scheduling parameter that is within a second range that corresponds to a full state of the secondary fuel manifold.

In some examples, the at least one engine schedule limit includes an engine core acceleration (ECA) limit and an engine max fuel flow rate ($Wfdot_{max}$) limit. The measured value of the scheduling parameter comprises an engine core acceleration measurement. The setting of the at least one engine schedule limit based on the measured value of the scheduling parameter that is within the first range comprises: setting the ECA limit to a first ECA value; and setting the engine max fuel flow rate ($Wfdot_{max}$) limit to a first value. The adjusting of the at least one engine schedule limit comprises: setting the ECA limit to a second ECA value that is less than the first ECA value, thereby controlling the at least one operational parameter of the engine to target the second ECA value; and setting the engine max fuel flow rate ($Wfdot_{max}$) limit to a second value that is less than the first value.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
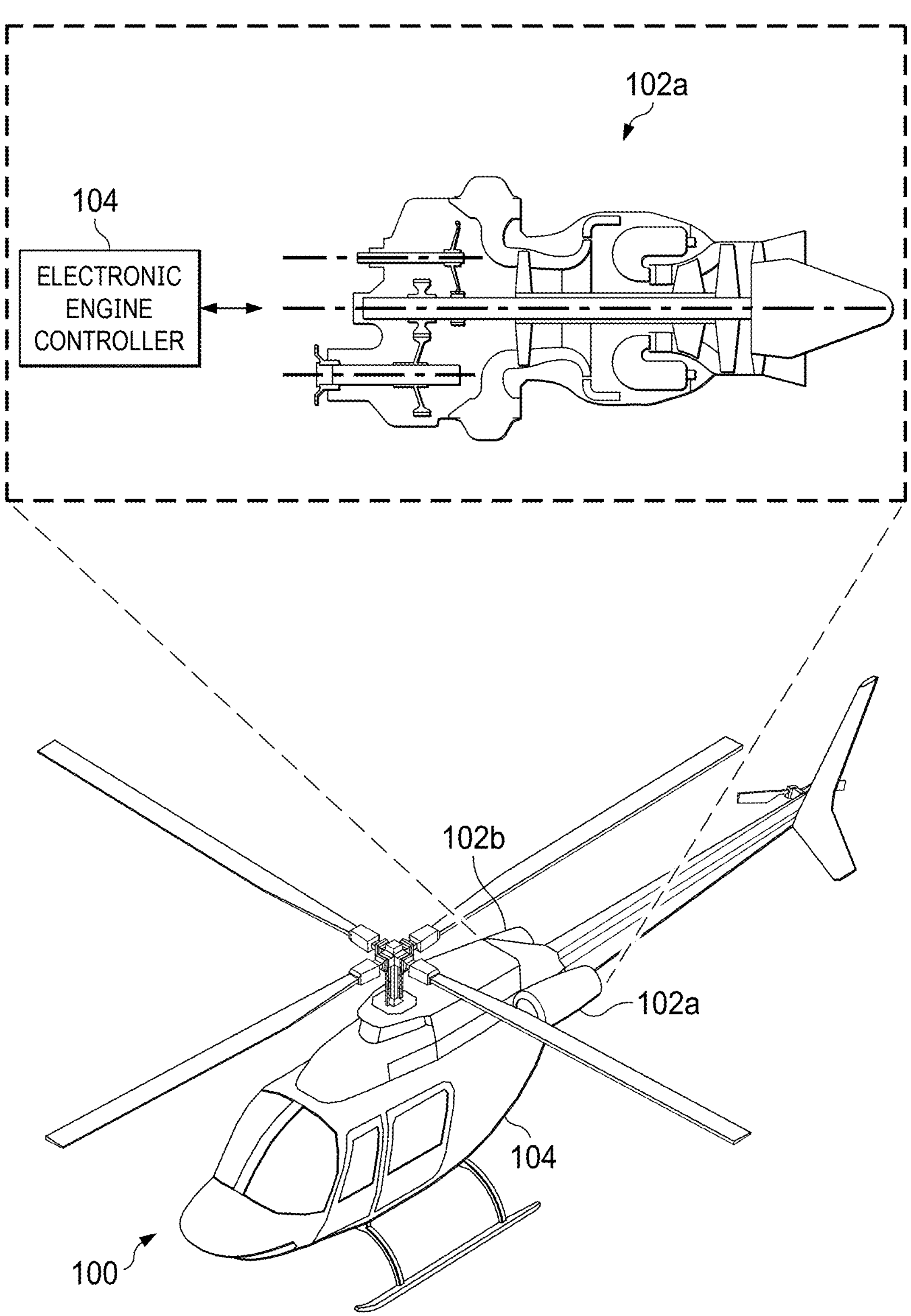
FIG. 1 illustrates an example aircraft supporting systems and method for filling a fuel manifold of a gas turbine engine in accordance with this disclosure.

FIGS. 1 through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Some aircraft conditions are substantially stable, such as a cruise condition, during which it can be desirable to operate one engine of a multi-engine system in a high-power "active" mode and another engine in a low-power "standby" mode. This mode of operation, namely operating the multi-engine system asymmetrically such that one engine operates in the low-powered "standby" mode and another engine in the high-powered "active" mode, can also be referred to as an Asymmetric Operating Regime (AOR). It may be desirable to operate the engines asymmetrically in this manner in order to provide fuel saving opportunities to the aircraft.

While the aircraft may be able to operate during standard cruise conditions with only one of the two engines providing motive power to the aircraft, the standby engine should be able to quickly transition out of its condition where the secondary manifold of an engine is empty (or partially empty) and not receiving flowing fuel (or not receiving enough flowing fuel to be full) if a need arises. For example, if the pilot requires additional power quickly in order to perform a flight maneuver, or in the event of an emergency caused by mechanical failure of the active engine. In some cases, the low-power "standby" mode is a case in which no power is provided to the engine. The high-power "active" mode can be referred to as a high-fuel mode in which fuel from within a primary fuel manifold (PFM) is injected into a combustion chamber through a duplex set of fuel nozzles, and fuel from within a secondary fuel manifold (SFM) is injected into the combustion chamber through all of the fuel nozzles (duplex and simplex). The low-power "standby" mode can be referred to as a low-fuel mode in which the primary fuel manifold does not inject any fuel into the combustion chamber thru the duplex nozzles.

Starting a gas turbine engine, either on the ground or in-flight, requires filling of a fuel manifold and fuel nozzle before fuel reaches the combustor and starts to combust. When starting a gas turbine engine on the ground, it can be assumed that the fuel manifold is empty and needs to be filled. On the other hand, when starting a gas turbine engine in-flight, a transition from below to above the cracking point can occur.

Exiting the AOR mode is an example of a transition from low fuel mode to high fuel mode of a gas turbine engine. The SFM is filled with fuel in order for the aircraft to operate in the high-fuel mode. An aircraft engine fuel management system fills the SFM during a transition period from the low-fuel mode to high-fuel mode. When starting a gas turbine engine in-flight, the engine fuel management system can make an assumption that the fuel manifold is empty and needs to be filled, or the engine fuel management system can execute an open-loop operation to fill the SFM. However, this assumption or this open-loop operation can lead to problems in the engine.

This disclosure generally relates to a single or multi-engine system for an aircraft, and more particularly to a system and method for filling a fuel manifold of a gas turbine engine while exiting a low power mode. Operation of one or more engines in a low power mode in a multi-engine system yields fuel savings opportunities. This is just one reason to operate the engines asymmetrically in a multi-engine system. There may be other suitable reasons why it may be desirable to operate the engines asymmetrically.

The embodiments of this disclosure provide technical advantages to a multi-engine system for an aircraft for transition from a low fuel mode to high fuel mode in which the SFM needs to be filled.

FIG. 1 illustrates an example aircraft 100 supporting systems and method for filling a fuel manifold of a gas turbine engine in accordance with this disclosure. As shown in FIG. 1, the aircraft 100 represents a helicopter having multiple engines **102*a*-102*b*, where at least one engine 102*a* is positioned on one side of the aircraft 100 and at least one engine 102*b* is positioned on the opposite side of the aircraft 100. Note that the form of the aircraft 100 shown in FIG. 1 is for illustration only and that the aircraft 100 may have any other suitable form. In the case that the aircraft is a helicopter, these gas turbine engines 1021-102*b* can be turboshaft engines. As another example, while the aircraft 100 in this example has two engines 102*a*-102*b*, the aircraft 100 may have any other numbers of engines, such as when two or more engines are positioned on different sides of the aircraft 100**.

As described in more detail below, the engines **102*a*-102*b* can be associated with an electronic engine control (EEC) system or a flight management system (FMS) (EEC/FMS) 104 of the aircraft 100. The EEC/FMS 104 may be implemented using one or more processing devices, such as one or more microprocessors, microcontrollers, digital signal processors (DSPs), application specific integrated circuits (ASICs), field programmable gate arrays (FPGAs), or discrete circuitry. This disclosure does not limit the EEC/FMS 104 to any particular type of device or system. In some embodiments, the EEC/FMS 104 may include or implement systems and method for filling a fuel manifold of a gas turbine engine, such as one or more the engines 102***a*-102*b*.

Although FIG. 1 illustrates one example of an aircraft 100 supporting systems and method for filling a fuel manifold, various changes may be made to FIG. 1. For example, as noted above, the form of the aircraft 100 and the positions of the engines 102*a*-102*b* on the aircraft 100 can vary depending on the implementation. Also, any suitable system or subsystem of the aircraft 100 may benefit from or use the disclosed techniques for filling a fuel manifold.

Figure 2:
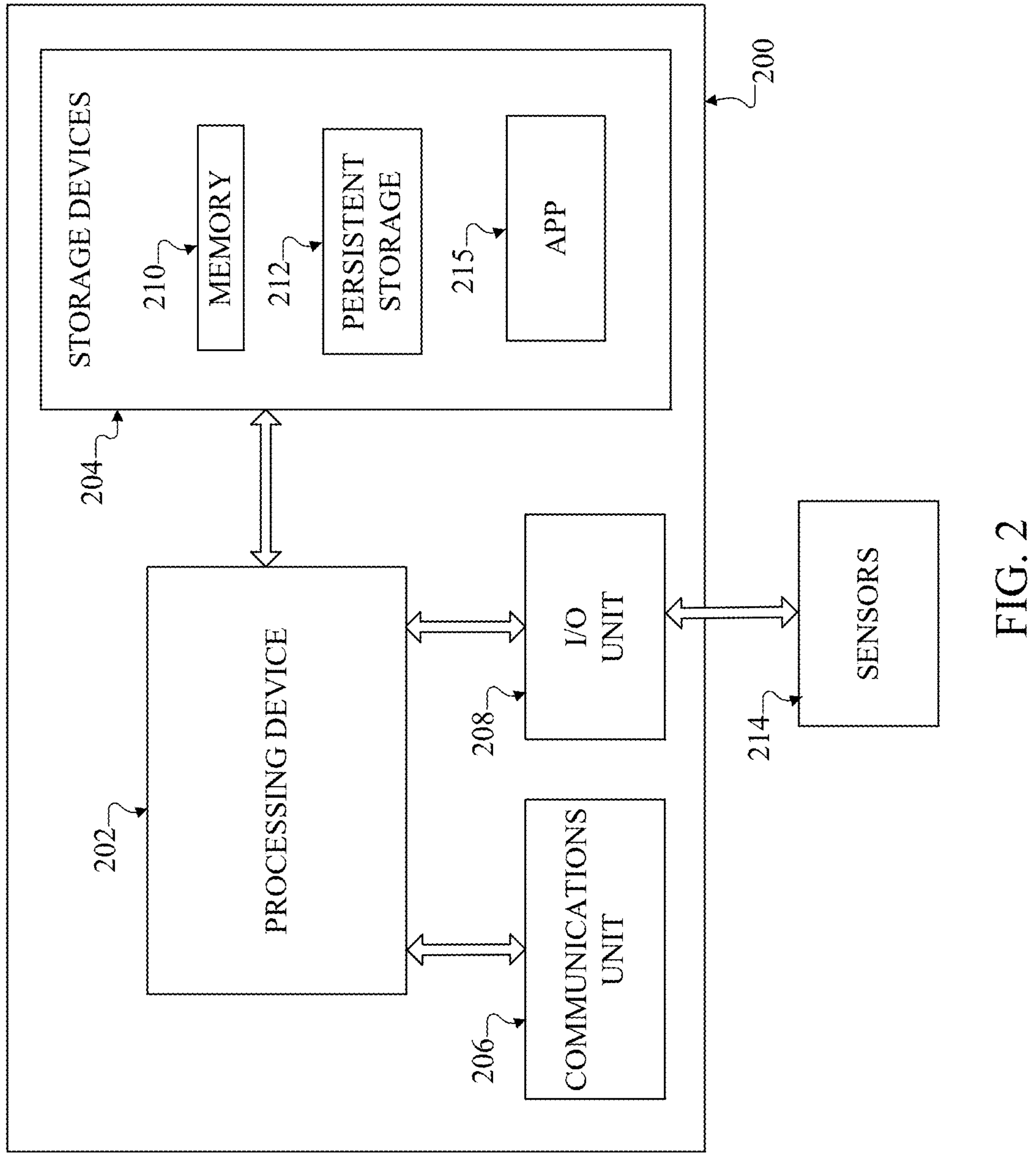
FIG. 2 illustrates an example computing device or system supporting systems and method for filling a fuel manifold of a gas turbine engine in accordance with this disclosure.

FIG. 2 illustrates an example computing device or system 200 supporting systems and method for filling a fuel manifold of a gas turbine engine in accordance with this disclosure.

As shown in FIG. 2, the computing device or system 200 may include at least one processing device 202, at least one optional storage device 204, at least one communications unit 206, and at least one optional input/output (I/O) unit 208. The processing device 202 may execute instructions that can be loaded into a memory 210 or other location that is local to the processing device 202. The processing device 202 includes any suitable number(s) and type(s) of processors or other processing devices in any suitable arrangement. Example types of processing devices 202 include one or more microprocessors, microcontrollers, digital signal processors (DSPs), ASICs, FPGAs, or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. The communications unit 206 may support communications through any suitable physical or wireless communication link(s), such as a network or dedicated connection(s).

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the computing device or system 200 does not require local I/O, such as when the computing device or system 200 represents a server or other component that can be accessed remotely over a network.

Although FIG. 2 illustrates one example of a computing device or system 200 supporting systems and method for filling a fuel manifold according to this disclosure, various changes may be made to FIG. 2. For example, computing devices and systems come in a wide variety of configurations, and FIG. 2 does not limit the secondary fuel manifold (SFM) filler to any particular computing device or system. For example, the computing device or system 200 can be the EEC/FMS 104 of FIG. 1. As another example, the I/O unit 208 can connect to external devices (external to the computing device or system 200), such as sensors 214 that measure fuel flow (Wf), compressor section exit pressure (P3), speed, and power of the gas turbine engine. As yet another example, the storage device 204 can store an application 215 that, when executed, enables the computing device or system 200 to perform the functions of the systems and methods for filling a fuel manifold as described in this disclosure.

Figure 3:
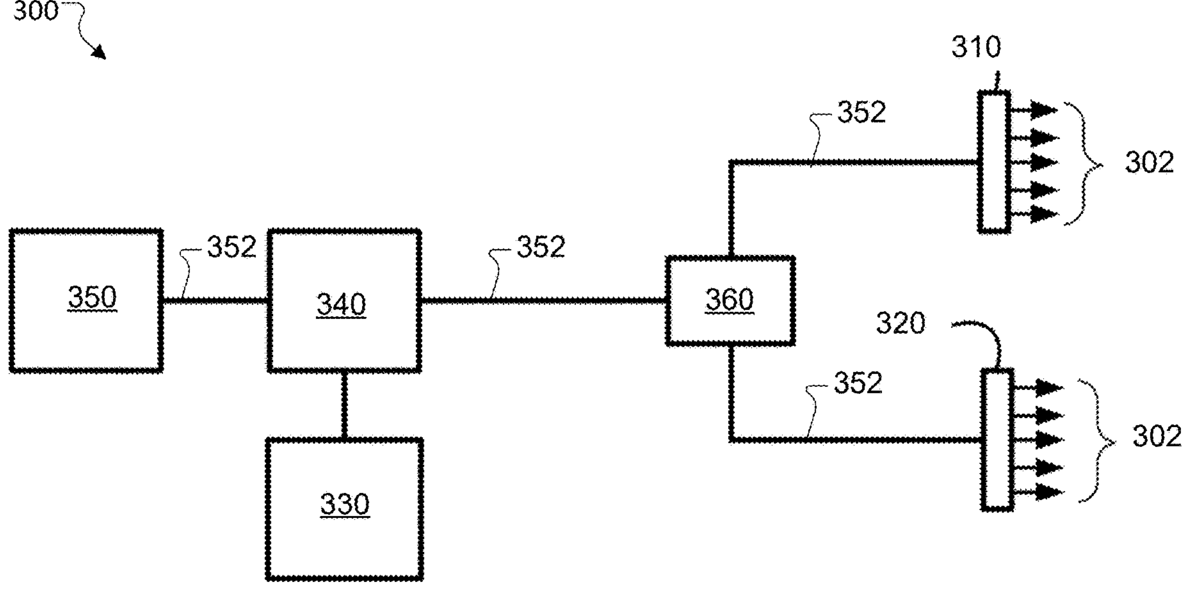
FIG. 3 illustrates an engine fuel management system for supplying fuel to the combustor of the gas turbine engine in accordance with this disclosure.

FIG. 3 illustrates an engine fuel management system 300 for supplying fuel to the combustor of the gas turbine engine 102 in accordance with this disclosure. A first set of nozzles 302 of a primary fuel manifold (PFM) 310 supplies fuel to the combustor. A second set of fuel nozzles 302 of a secondary fuel manifold (SFM) 320 supplies fuel to the combustor. An electronic controller 330 controls a fuel pump 340 to supply fuel from a reservoir 350 to the fuel manifolds 310 and 320 through one or more fuel lines 352. The electronic controller 330 can be the EEC/FMS 104 of FIG. 1, or can be the processing device 202 of FIG. 2. The fuel pump 340 provides the fuel to a fuel flow divider 360, which is operably connected to the fuel manifolds 310 and 320.

The PFM 310, SFM 320, or both manifolds 310 and 320 can be used to supply fuel to the combustor depending on the operating mode of the engine 102. For example, when the operating mode of the engine 102 is a high-fuel mode (also referred to as high-power mode or "active" mode), a higher fuel flow is utilized, and the fuel flow divider 360 directs fuel to both the PFM 310 and the SFM 320. In some embodiments, the majority of fuel supplied to the combustor is supplied via the secondary manifold 312 when the engine 102 operates in the high-fuel mode.

When the operating mode of the engine 102 is a non-full non-filling state (also referred to as a low-fuel mode or low-power mode or standby mode) the SFM 320 of the engine 102 is at least partially empty and is not receiving fuel at a fuel flow that exceeds a threshold filling fuel flow. That is, the SFM 302 is in the non-fully state when the SFM is empty or partially empty. The SFM 302 is in non-filling state when the fuel flow rate through the one or more fuel lines 352 is less than threshold filling fuel flow (namely, a fuel flow great enough to maintain the SFM in a full state), in which case, fuel is not flowing into the SFM or alternatively, fuel that is flowing into the SFM is not flowing enough to maintain the SFM in the full state. When the operating mode is the non-full non-filling (NFNF) state, a low fuel flow is utilized, the fuel flow divider 360 directs fuel to the PFM 310, and all of the fuel supplied to the combustor is supplied via PFM 310. In some embodiments, the fuel flow divider 360 can prevent fuel from flowing to the SFM 320 or stop providing fuel to the SFM 320 when the engine 102 operates in the low-fuel mode.

When operating the engine 102 in the low-fuel mode, in order to avoid coking of the stagnant residual fuel in the SFM 320, the fuel in the SFM 320 may be purged into the combustor, siphoned back into an accumulator device, or naturally emptied through gravity. There may also be other reasons for which it is desirable to purge or empty a fuel manifold when fuel is supplied to the combustor through a different manifold.

Figure 6:
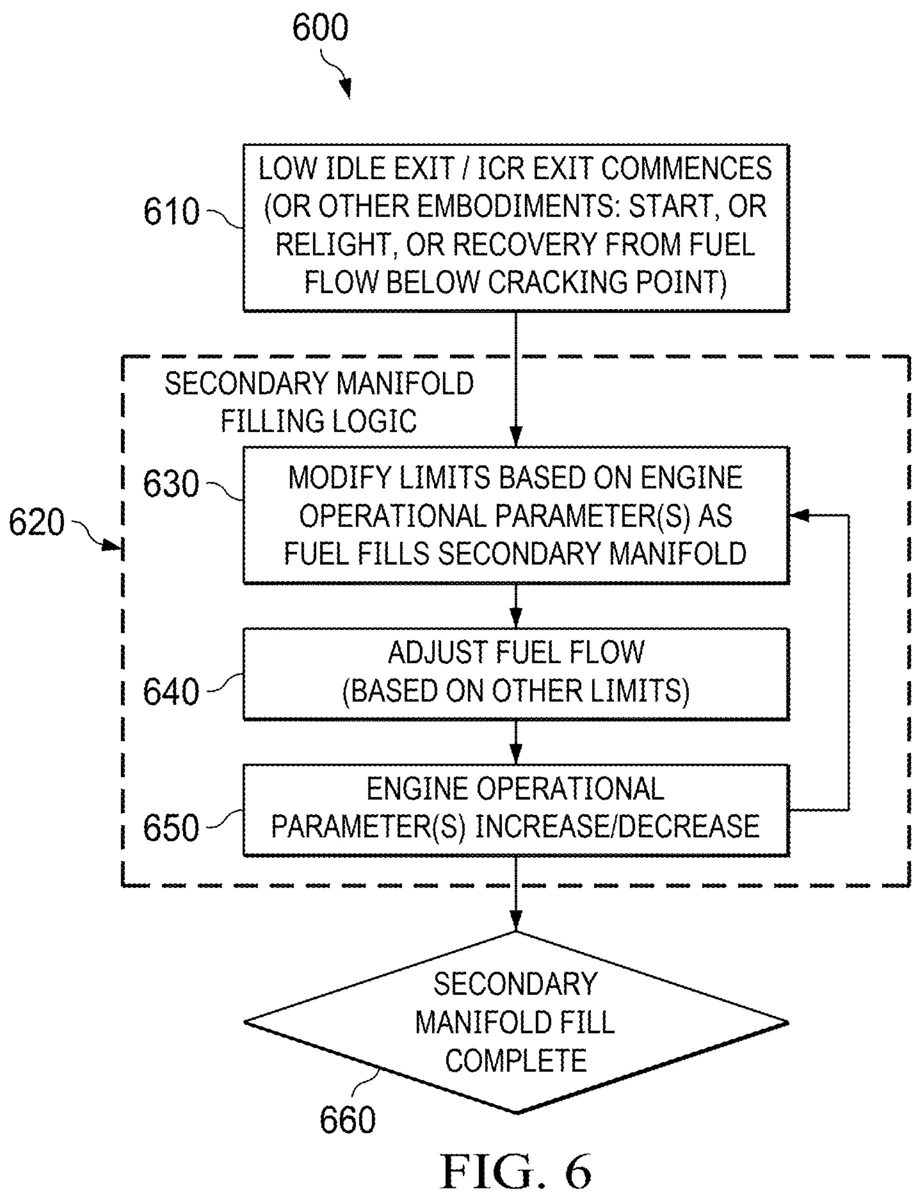
FIG. 6 illustrates an example method for filling a fuel manifold of a gas turbine engine in accordance with this disclosure.

When the engine 102 exits the low-fuel mode, the SFM 320 may be filled using systems and methods for filling a fuel manifold as described in this disclosure, which can be a controlled refilling procedure. An example method for filling the fuel manifold in accordance with embodiments of this disclosure is illustrated in FIG. 6. In particular, one or more engine operational parameters are monitored as the manifold is filled in order to prevent engine surge.

Figure 4:
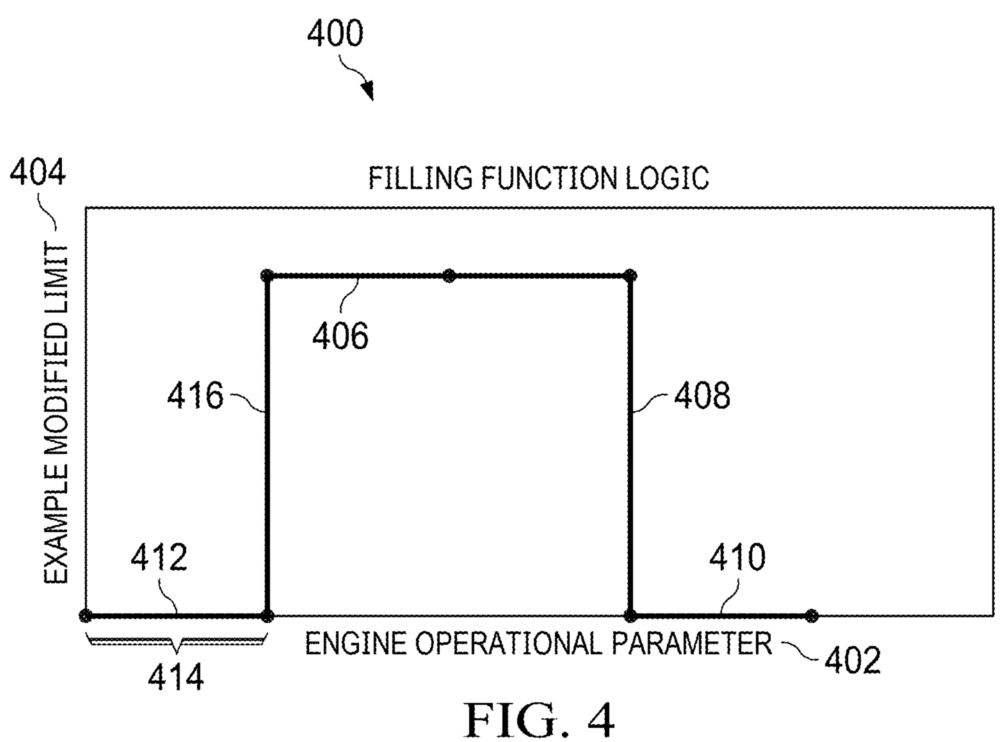
FIG. 4 illustrates an example closed-loop filling function including limit modification based on an engine operational parameter in accordance with this disclosure.

FIG. 4 illustrates an example closed-loop filling function 400 including limit modification based on an engine operational parameter in accordance with this disclosure. The embodiment of the closed-loop filling function 400 shown in FIG. 4 is for illustration only, and other embodiments could be used without departing from the scope of this disclosure. The closed-loop filling function 400 can be used by the controller 330 of the engine fuel management system of FIG. 3.

Embodiments of this disclosure shorten the amount of time for AOR standby exit. This time reduction provides advantages for overall AOR implementation.

The closed-loop filling function 400 can be used to modify limits and control dynamics gains based on at least one engine operational parameter of the gas turbine engine as the SFM fills. Additionally, the closed-loop filling function 400 can be used to provide fuel flow based on this closed-loop control. The y-axis represents an example limit 404 that the controller 330 modifies based on at least one engine operational parameter 402, which is represented as the x-axis. For example, the controller 330 provides higher fuel flow 406 when filling the SFM 320 with fuel, and reduces 408 fuel flow to a lower fuel flow 410 when the engine operational parameter is indicative that either a flow divider valve (such as the fuel flow divider 360) has cracked or the fuel has reached the combustor. Prior to filling the SFM 320, a first fuel flow 412 can be used, and the first fuel flow 412 can be equivalent to the lower fuel flow 410 or can be less than the lower fuel flow 410. One or more additional limits can be modified with respect to the at least one engine operational parameter 402. That is, the limit 404 of embodiments of this disclosure is not limited to two possible limits (such as the higher fuel flow 406 and the lower fuel flow 410), as the limit 404 can be selected from a set of limits includes more than two possible limits, for example, a set that includes an additional limit that is a value different than the higher fuel flow 406 and the lower fuel flow 410. The set of limits that includes more than two possible limits corresponds to more than two possible states, including the NFNF state, the full state, and an additional state that corresponds to the additional limit. The additional state can be defined by a measured engine operational parameter 402 (such as a measured scheduling parameter), and this additional state triggers the additional limit (at the alternate value), for example to be used to slow down the filling of the SFM 320 either at initiation of filling the SFM or towards the end of filling the SFM (such as when the SFM is partially filled to at least a threshold fill level that is less than a completely full level).

During the period of time 414 while secondary manifold is not yet filling, if the engine operational parameter 402 changes as a result of initial fuel increase, this may result in a fuel reduction, followed by subsequent fuel increase 416 to fill the SFM 320 and further fuel reduction 408 when the engine operational parameter 402 indicates the fuel has reached the combustor.

The at least one engine operational parameter 402 can include a rate of change of pressure at the outlet of the compressor of the engine (such as the rate of change of P3), an engine core spool speed (Ng), a rate of change of the engine core spool speed (Ngdot), or a ratio unit (RU) that is a ratio of commanded fuel flow (Wf) to P3. The rate of change of P3 can be derived from P3 as measured by sensor 214. The sensor 214 can be a speed sensor positioned to measure engine core spool speed (Ng), and the Ngdot can be derived from Ng as measured by the sensor 214. The Ngdot can be measured directly by an accelerometer or another sensor suitable for measuring acceleration.

Figure 5:
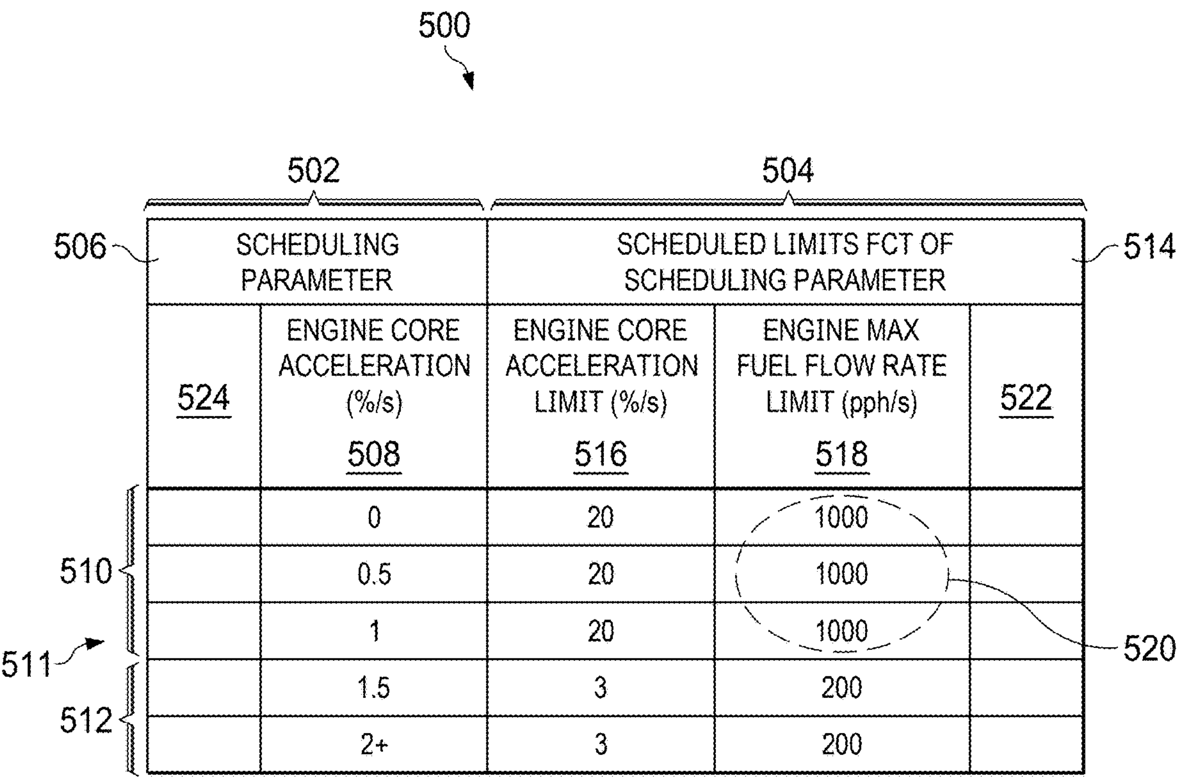
FIG. 5 illustrates a table of engine parameters and limits in accordance with this disclosure.

FIG. 5 illustrates a table 500 of engine parameters 502 and limits 504 in accordance with this disclosure. The embodiment of the table 500 shown in FIG. 5 is for illustration only, and other embodiments could be used without departing from the scope of this disclosure. The table 500 can be included within the application 215 of FIG. 2 or used by the controller 330 of FIG. 3 to control the filling of the volume of the SFM 320.

The engine parameters 502 shown in column 1 of the table 500 correspond to the at least one engine operational parameter 402 of FIG. 4. In this example, the engine parameters 502 include a scheduling parameter 506 that represents fuel reaching the combustor. The scheduling parameter 506 can include engine core acceleration 508 because if no fuel is reaching the combustor, then the engine core acceleration will be no acceleration (such as zero engine core acceleration) or low acceleration 510. As long as the SFM 320 is partially filled and not yet full, the engine core acceleration remains low such as in a range less than or equal to 1%, as shown in rows 1-3 of the table 500.

Once the SFM is full, then any additional fuel added to the SFM will be injected into the combustion chamber of the combustor through the second set of nozzles 302 of the SFM 320. The controller 330 operates based on an assumption that the point at which the SFM 320 reaches the full state is the point at which the engine core acceleration measurement increases to exceed a threshold 511 (such as 1%) due to the combustion chamber receiving and burning fuel injected through the second set of nozzles 302 of the SFM 320. The engine core acceleration measurement is an example of a measured value of a scheduling parameter 506. The measured value of each of the scheduling parameters 506 can be measured by sensors, or can be synthesized. High acceleration 512 refers to engine core acceleration that exceeds the threshold 511. That is, the high acceleration 512 corresponds to the condition in which the SFM 320 is in a full state, and the low acceleration 510 corresponds to the condition in which the SFM 320 is in a non-full state (such as completely empty or partially filled). The engine core acceleration 508 can be in units of percent per second (%/s). The threshold 511 is not limited to being 1%/s, for example, the threshold 511 can be 1.5%/s, or any suitable value indicating whether fuel is reaching the combustor based on the capabilities of the engine 102 or the aircraft 100.

The engine limits 504 of the table 500 correspond to the modified limit 404 of FIG. 4. That is, the controller 330 uses the scheduling parameter 506 as a basis to select the limits 504, as shown in columns 2 and 3 the of table 500. In this example, the limits 504 represent scheduled limits 514 as a function of the measured value of the scheduling parameter. The scheduled limits 514 include an engine core acceleration limit 516 (in units of %/s) and an engine maximum fuel flow rate limit ($Wfdot_{max}$) 518 (in units of pounds per hour (pph) per second). Engine core acceleration limit 516 is a target, for example, the EEC/FMS can transition operations of the aircraft toward achieving the target. Engine max fuel flow rate limit 518 is a maximum amount of fuel flow increase that the controller 330 can control the engine 102 to output in order to reach the targeted acceleration limit. In some embodiments, the scheduled limits 514 can also include a maximum fuel flow (in units of pph) in addition to or instead of the maximum fuel flow rate limit 518 (in units of pph/s).

Maximum capabilities 520 of the fuel flow can be used when the SFM 320 is not yet full, as indicated by the condition in which the measurements of the engine core acceleration 508 are in the range of the low acceleration 510. In order to fill the volume of SFM 320 as quickly as possible, the maximum capabilities 520 of fuel flow rate can be used during the filling of the SFM 320. When the engine core acceleration 508 enters the range of high acceleration 512, the controller 330 determines SFM 320 is in the full state and reduces the limits 504 in order to avoid over-temperatures of the engine and avoid pressure instability (such as, compressor surge). The scheduled limits 504 are greater when the scheduling parameter 502 is low because more fuel can be added to quickly fill the manifold without risk of engine surge or over-temperature.

Although FIG. 5 illustrates an example table 500, various changes may be made to FIG. 5. More than one set of limits with respect to engine operational parameters may be implemented and selection varies based on engine hardware. For example, more than one set of limits 504 with respect to engine operational parameters 502 may be implemented, and selection logic may be used to determine applicable limits 504 (for example, to select a minimum limit or to select a maximum limit).

If more than one set of limits 514 is modified, each modified limit may be modified versus a different scheduling operational parameter. For example, the $Wfdot_{max}$ 518 can be controlled as a function of the engine core acceleration 508, while a third engine limit 522 (could be added as column 4 of the table 500) among the engine limits 504 is controlled as a function of different scheduling parameters 524 that are different from the engine core acceleration 508. This third engine limit 522 can be a function of a second engine scheduling parameter 524 that could be added as column 0 of the table 500. This second engine scheduling parameter 524 can be a rate of change of the P3 or rate of change of temperature downstream of the combustion chamber (such as exhaust gas temperature). Examples of this third engine limit 522 include a temperature limit or a maximum fuel flow limit (maximum Wflimit).

FIG. 6 illustrates an example method 600 for filling a fuel manifold of a gas turbine engine in accordance with this disclosure. The method 600 can be implemented by an electronic device, such as the EEC/FMS 104 of FIG. 1, the computing device or system 200 of FIG. 2, or controller 330 of FIG. 3. More particularly, the method 600 can be performed by a processing device 202 executing the application 215 of FIG. 2. For ease of explanation, the method 600 is described as being performed by the processing device 202.

Referring to the method in FIG. 6, at block 610, the processing device 202 determines that an engine 102 (such as the engine 102*a*) commences to exit from an operating mode that is the NFNF state. More particularly, the engine commences to transition from the low-fuel mode associated with a low fuel set point to the high-fuel mode associated with a high fuel set point. For example, the engine 102 commences AOR standby exit, starts operating (such as on the ground), relights (such as starts operating in-flight) following an engine shutdown, or recovers from fuel flow below a cracking point of a flow divider valve. The cracking point is a pressure above at which the fuel flow divider 360 starts providing fuel flow to the SFM 320. Commencement of the exit from the NFNF state triggers the processing device 202 to perform a sub-process 620 of filling the SFM. In some embodiments, the sub-process 620 is triggered when the engine 102 is operating below secondary manifold cracking point during regular operation/maneuvers and not necessarily for AOR standby exit.

The processing device 202 performs a sub-process 620 of filling the SFM. The sub-process 620 includes blocks 630, 640, and 650.

At block 630, the processing device 202 modifies limits 504 based on engine operational parameters(s) 502 as fuel fills the SFM 320. For example, the core acceleration limit 516 or a compressor exit pressure (P3) limit can increase.

At block 640, the processing device 202 adjusts the fuel flow (also referred to as commanded fuel flow (Wf)). The adjustment to the fuel flow can be based on other limits that are other than the commanded fuel flow. For example, the processing device 202 can adjust the fuel flow based on the $Wfdot_{max}$ 518. For example, the $Wfdot_{max}$ 518 can be an upper limit for the commanded fuel flow.

At block 650, the processing device 202 monitors measurements of the engine operational parameter(s) 402, 502 to identify an increase or decrease to the measured value(s) of engine operational parameter(s). In response to identifying a change to the engine operational parameter(s) 502, the processing device 202 can repeat the procedure of block 630 to update the engine limits 504 and can proceed to block 660. Updating the engine limits can include maintaining the engine limits at current settings, or can include further modifying the engine limits 504.

At block 660, the processing device 202 determines whether the sub-process 620 of filling the SFM 320 is complete.

In a first embodiment, the processing device 202 determines the sub-process 620 is complete based on elapse of a predefined time interval (such as 0.5 or 1 second). For example, the processing device 202 can utilize the higher fuel flow 406 of FIG. 4 for the predefined time interval, and then determine that the SFM 320 switched from the non-full state to the full state in response to elapse of the predefined time interval. In this first embodiment, the engine limits 404 can be variable based on the engine operational parameter 402, such that the higher fuel flow 406 is only active for a defined time interval after AOR standby exit is commenced. This time interval may be variable based on altitude, temperature, airspeed, RAM, or an engine operational parameter.

In a second embodiment, the processing device 202 determines the sub-process 620 is complete based on exceeding the threshold 511 of a scheduling parameter 506 being exceeded by measurements of that scheduling parameter 506.

Although FIG. 6 illustrates an example method 600 for filling a fuel manifold of a gas turbine engine, various changes may be made to FIG. 6. For example, while shown as a series of steps, various steps in FIG. 6 could overlap, occur in parallel, occur in a different order, or occur any number of times. As a particular example in case of the above-described second embodiment, after the sub-process 620 is complete, a transition to standard loop control includes modified limits 504 applicable to this adjustment only (for example, modified fuel flow rate (WFdot) minimum). These modified limits 504 may be applied for the defined time interval as defined in the first embodiment or may be applied for an additional time interval.

In a third embodiment, the defined limits 504 with respect to the engine operational parameter 502 may vary based on altitude, temperature, airspeed, RAM, time below a specific fuel flow or fuel pressure, or an alternate engine operational parameter.

In a fourth embodiment, the sub-process 620 includes modifications (at block 630) to limits 504 and adjustments (at block 650) to parameters 506 dependent on the type of AOR Exit commanded. The type of AOR Exit commanded can be specified by 131866 AOR TRANSITION PROFILES that provide a definition of different types of AOR Exit.

Figure 7:
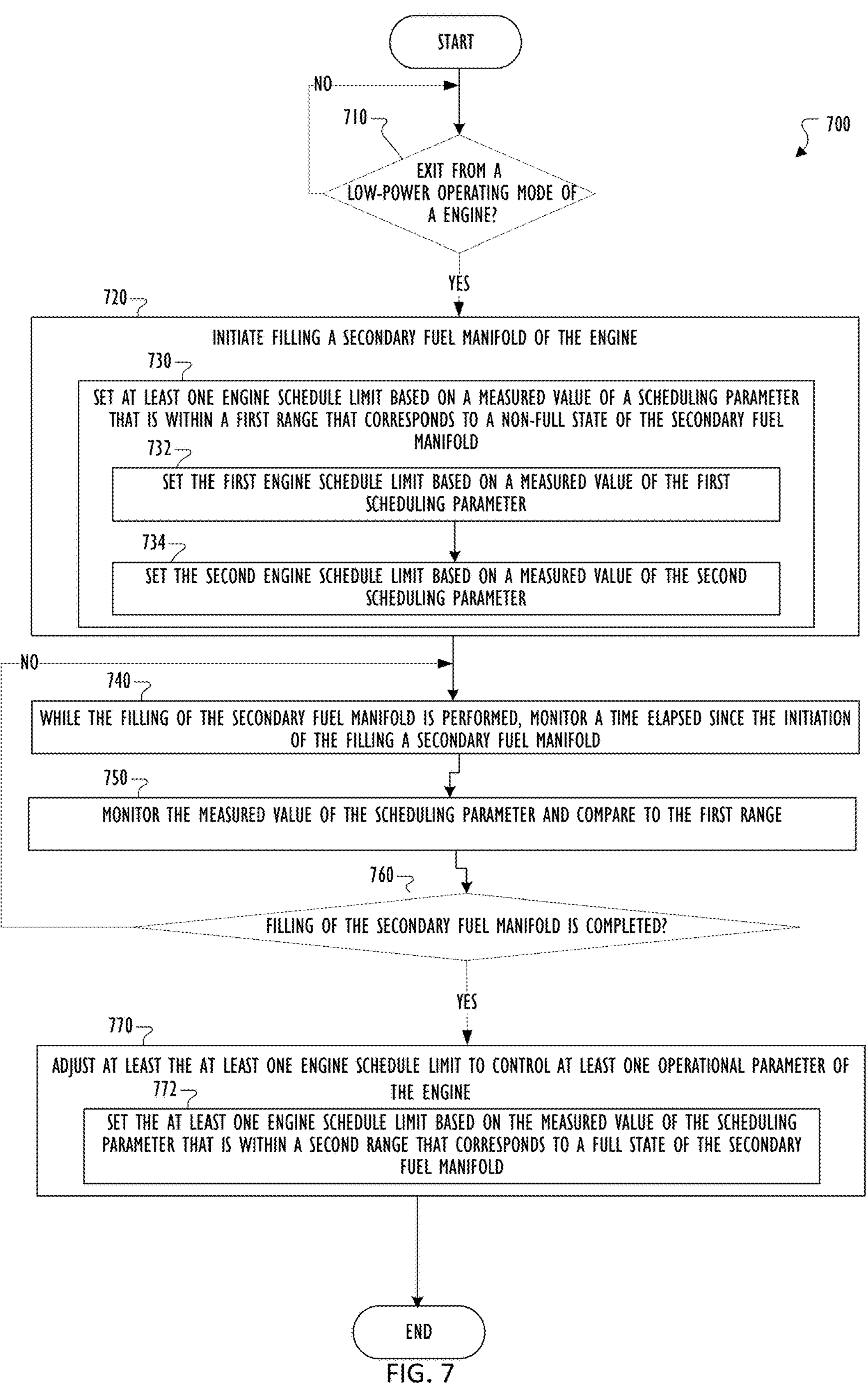
FIG. 7 illustrates another example method for filling a fuel manifold of a gas turbine engine in accordance with this disclosure.

FIG. 7 illustrates another example method 700 for filling a fuel manifold of a gas turbine engine in accordance with this disclosure. The method 700 can be implemented by an electronic device, such as the EEC/FMS 104 of FIG. 1, the computing device or system 200 of FIG. 2, or controller 330 of FIG. 3. More particularly, the method 700 can be performed by a processing device 202 executing the application 215 of FIG. 2. For ease of explanation, the method 700 is described as being performed by the processing device 202.

Referring to the method 700 of FIG. 7, the procedure at blocks 710, 720, 730, and 760 can be the same as or similar to the procedure of blocks 610, 620, 630, and 660 respectively. At block 710, exiting the NFNF state of an engine includes at least one of: starting the engine; relighting the engine; exiting an Asymmetric Operating Regime (AOR) standby mode of an engine; exiting a low-fuel mode; or recovering from fuel flow below a flow divider valve cracking point.

At block 720, the processing device 202 can, in response to exiting the NFNF state of an engine, initiate filling a secondary fuel manifold of the engine.

At block 730, the processing device 202 can set at least one engine schedule limit based on a measured value of a scheduling parameter that is within a first range that corresponds to a non-full state of the secondary fuel manifold. The at least one engine schedule limit can include a first engine schedule limit and a second engine schedule limit. The scheduling parameter can include a first scheduling parameter and a second scheduling parameter different from the first scheduling parameter.

At block 732, the processing device 202 can set the first engine schedule limit based on a measured value of the first scheduling parameter. At block 734, the processing device 202 can set the second engine schedule limit based on a measured value of the second scheduling parameter.

At block 740, the processing device 202 can, while the filling of the secondary fuel manifold is performed, monitor a time (for example, a specified first duration of time) elapsed since the initiation of the filling of a secondary fuel manifold. The time elapsed since the initiation of the filling of a secondary fuel manifold can be monitored to enable a comparison to a specified first duration of time, which is associated with an assumption that the SFM is full. In some embodiments, the time elapsed since the initiation of the filling of a secondary fuel manifold can be monitored to enable a comparison to a specified second duration of time, which can follow the first duration of time.

At block 750, the processing device 202 can monitor the measured value of the scheduling parameter and compare to the first range. The measured value of the scheduling parameter can be monitored to enable the processing device 202 to determine the measured value of the scheduling parameter is no longer within the first range, or make an alternative determination that the measured value of the scheduling parameter still remains within the first range.

At block 760, the processing device 202 can determine whether the filling of the secondary fuel manifold is completed. In some embodiments, to determine that the filling of the secondary fuel manifold is completed, the processing device 202 can determine that a specified first duration of time elapsed from the initiation of the filling a secondary fuel manifold.

At block 770, the processing device 202 can adjust at least one operational parameter of the engine, in response to a determination that the filling of the secondary fuel manifold is completed. In some embodiments, to determine (at block 760) that the filling of the secondary fuel manifold is completed, the processing device 202 can: determine the measured value of the scheduling parameter is no longer within the first range; and adjust (at block 770) the at least one operational parameter of the engine by setting (at block 772) the at least one engine schedule limit based on the measured value of the scheduling parameter that is within a second range that corresponds to a full state of the secondary fuel manifold. In some embodiments, the processing device 202 can adjust at least one operational parameter of the engine, in response to a determination that the measured value of the scheduling parameter (for example, a measured engine operational parameter 402 of FIG. 4 or engine operational parameters(s) 502 of FIG. 5) is within a third or subsequent range used to modify the schedule limit, for example to slow down the filling of the SFM 320. To slow down the filling of the SFM, the processing device 202 can set the at least one engine schedule limit to an additional limit (namely, the intermediate value) between a minimum limit of the applicable limits 504 and a maximum limit (such as maximum capabilities 520). The third or subsequent range can correspond the measured value of the scheduling parameter, which is for example indicating the SFM partially filled to at least a threshold fill level, which occurs towards the end of filling the SFM. The third or subsequent range can correspond to the measured value of the scheduling parameter indicating an initiation of filling the SFM.

In some embodiments, the at least one engine schedule limit includes an engine core acceleration (ECA) limit and an engine max fuel flow rate ($Wfdot_{max}$) limit. The measured value of the scheduling parameter comprises an engine core acceleration measurement. The setting of the at least one engine schedule limit based on the measured value of the scheduling parameter that is within the first range comprises: setting the ECA limit to a first ECA value; and setting the engine max fuel flow rate ($Wfdot_{max}$) limit to a first $Wfdot_{max}$ value. The adjusting of the at least one engine schedule limit comprises: setting the ECA limit to a second ECA value that is less than the first ECA value, thereby controlling the at least one operational parameter of the engine to target the second ECA value; and setting the engine max fuel flow rate ($Wfdot_{max}$) limit to a second $Wfdot_{max}$ value that is less than the first $Wfdot_{max}$ value.

In some embodiments, the processing device 202 can, in response to the determination that the filling of the secondary fuel manifold is completed, maintain the at least one engine schedule limit set based on the measured value of the scheduling parameter that is within the first range for a second duration of time that follows the elapse of the first duration of time. The processing device 202 can adjust the at least one engine schedule limit after the second duration of time elapses. In such embodiments, at least one modified limit extends for an additional specified duration of time beyond the specified first duration of time, to allow for continued fast reduction of fuel flow when the SFM is full.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S. C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S. C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

in response to exiting a non-full non-filling state of a gas turbine engine in which a secondary fuel manifold of the engine is at least partially empty and is not receiving fuel at a fuel flow that exceeds a threshold filling fuel flow, initiating filling the secondary fuel manifold of the engine, including:

setting at least one engine schedule limit based on a measured value of scheduling parameters that is within a first range that corresponds to a non-full state of the secondary fuel manifold;

determining whether the filling of the secondary fuel manifold is completed; and adjusting the at least one engine schedule limit to control at least one operational parameter of the engine, in response to a determination that the filling of the secondary fuel manifold is completed, by setting the at least one engine schedule limit based on a measured value of the scheduling parameters that is within a second range that corresponds to a full state of the secondary fuel manifold the at least one engine schedule limit based on the measured value within the second range is less than the at least one engine schedule limit based on the measured value within the first range, wherein the at least one engine schedule limit includes an engine core acceleration (ECA) limit.

2. The method of claim 1, wherein the at least one engine schedule limit includes a first engine schedule limit and a second engine schedule limit.

3. The method of claim 2, wherein the scheduling parameters include a first scheduling parameter and a second scheduling parameter different from the first scheduling parameter; setting the at least one engine schedule limit based on the measured value of the scheduling parameters that corresponds to the non-full state of the secondary fuel manifold comprises: setting a first engine schedule limit based on a measured value of the first scheduling parameter; and setting a second engine schedule limit based on a measured value of the second scheduling parameter.

4. The method of claim 1, wherein exiting the non-full non-filling state of the engine includes at least one of:

starting the engine;

relighting the engine;

exiting an Asymmetric Operating Regine (AOR) standby mode of the engine of a multi-engine system;

exiting a low-fuel mode of the engine; or recovering from the fuel flow of the engine below a flow divider valve cracking point.

5. The method of claim 1, wherein determining that the filling of the secondary fuel manifold is completed comprises: determining a first duration of time elapsed from the initiating the filling of the secondary fuel manifold.

6. The method of claim 5, further comprising:

in response to determining that the filling of the secondary fuel manifold is completed, maintaining the at least one engine schedule limit based on the measured value of the scheduling parameters that is within the first range for a second duration of time that follows the first duration of time; and adjusting the at least one engine schedule limit after the second duration of time elapses.

7. The method of claim 1, wherein: determining that the filling of the secondary fuel manifold is completed further comprises: determining the measured value of the scheduling parameters is no longer within the first range.

8. The method of claim 1, wherein: the at least one engine schedule limit includes the ECA limit and an engine max fuel flow rate ($Wfdot_{ma}$) limit;

the measured value of the scheduling parameters comprises an ECA measurement;

setting the at least one engine schedule limit based on the measured value of the scheduling parameters that is within the first range comprises:

setting the ECA limit to a first ECA value; and setting the $Wfdot_m$ limit to a first value; and adjusting the at least one engine schedule limit comprises:

setting the ECA limit to a second ECA value that is less than the first ECA value, thereby controlling the at least one operational parameter of the engine to target the second ECA value; and setting the $Wfdot_m$ limit to a second value that is less than the first value.

9. An electronic device comprising: a processor configured to:

in response to exiting a non-full non-filling state of a gas turbine engine in which a secondary fuel manifold of the engine is at least partially empty and is not receiving fuel at a fuel flow that exceeds a threshold filling fuel flow, initiate filling the secondary fuel manifold of the engine, including:

set at least one engine schedule limit based on a measured value of scheduling parameters that is within a first range that corresponds to a non-full state of the secondary fuel manifold;

determine whether the filling of the secondary fuel manifold is completed; and adjust the at least one engine schedule limit to control at least one operational parameter of the engine, in response to a determination that the filling of the secondary fuel manifold is completed, by setting the at least one engine schedule limit based on the measured value of the scheduling parameters that is within a second range that corresponds to a full state of the secondary fuel manifold the at least one engine schedule limit based on the measured value within the second range is less than the at least one engine schedule limit based on the measured value within the first range, wherein the at least one engine schedule limit includes an engine core acceleration (ECA) limit.

10. The electronic device of claim 9, wherein the at least one engine schedule limit includes a first engine schedule limit and a second engine schedule limit.

11. The electronic device of claim 10, wherein:

the scheduling parameters include a first scheduling parameter and a second scheduling parameter different from the first scheduling parameter; to set the at least one engine schedule limit based on the measured value of the scheduling parameters that corresponds to the non-full state of the secondary fuel manifold, the processor is configured to:

set a first engine schedule limit based on a measured value of the first scheduling parameter; and set a second engine schedule limit based on a measured value of the second scheduling parameter.

12. The electronic device of claim 9, wherein exiting from the non-full non-filling state of the engine includes at least one of:

starting the engine;

relighting the engine;

exiting an Asymmetric Operating Regine (AOR) standby of the engine of a multi-engine system;

exiting a low-fuel mode of the engine; or recovering from the fuel flow of the engine below a flow divider valve cracking point.

13. The electronic device of claim 9, wherein to determine that the filling of the secondary fuel manifold is completed, the processor is configured to:

determine a first duration of time elapsed from the initiation of the filling the secondary fuel manifold.

14. The electronic device of claim 13, the processor is further configured to:

in response to determine that the filling of the secondary fuel manifold is completed, maintain the at least one engine schedule limit based on the measured value of the scheduling parameters that is within the first range for a second duration of time that follows the first duration of time; and adjust the at least one engine schedule limit after the second duration of time elapses.

15. The electronic device of claim 9, wherein: to determine that the filling of the secondary fuel manifold is completed, the processor is configured to determine the measured value of the scheduling parameters is no longer within the first range.

16. The electronic device of claim 9, wherein: the at least one engine schedule limit includes the ECA limit and an engine max fuel flow (Wfdot) limit;

the measured value of the scheduling parameters comprises an ECA measurement;

to set the at least one engine schedule limit based on the measured value of the scheduling parameters that is within the first range, the processor is configured to: set the ECA limit to a first ECA value; and set the $Wfdot_{ma}$ limit to a first value; and to adjust the at least one engine schedule limit, the processor is configured to: set the ECA limit to a second ECA value that is less than the first ECA value, thereby controlling the at least one operational parameter of the engine to target the second ECA value; and set the $Wfdot_{ma}$ limit to a second value that is less than the first value.

17. A non-transitory computer readable medium embodying a computer program, the computer program comprising computer readable program code that when executed causes at least one processor to: in response to exiting from a non-full non-filling state of a gas turbine engine in which a secondary fuel manifold of the engine is at least partially empty and is not receiving fuel at a fuel flow that exceeds a threshold filling fuel flow, initiate filling the secondary fuel manifold of the engine, including:

set at least one engine schedule limit based on a measured value of scheduling parameters that is within a first range that corresponds to a non-full state of the secondary fuel manifold;

determine whether the filling of the secondary fuel manifold is completed; and adjust the at least one engine schedule limit to control at least one operational parameter of the engine, in response to a determination that the filling of the secondary fuel manifold is completed, by setting the at least one engine schedule limit based on a measured value of the scheduling parameter that is within a second range that corresponds to a full state of the secondary fuel manifold the at least one engine schedule limit based on the measured value within the second range is less than the at least one engine schedule limit based on the measured value within the first range, wherein the at least one engine schedule limit includes an engine core acceleration (ECA) limit.

18. The non-transitory computer readable medium of claim 17, wherein:

the at least one engine schedule limit includes a first engine schedule limit and a second engine schedule limit;

the scheduling parameters include a first scheduling parameter and a second scheduling parameter different from the first scheduling parameter;

the program code that when executed causes the at least one processor to set the at least one engine schedule limit based on the measured value of the scheduling parameter that corresponds to the non-full state of the secondary fuel manifold, further comprise program code that when executed causes the at least one processor to:

set the first engine schedule limit based on a measured value of the first scheduling parameter; and set the second engine schedule limit based on a measured value of the second scheduling parameter.

19. The non-transitory computer readable medium of claim 17, wherein the program code that when executed causes the at least one processor to determine that the filling of the secondary fuel manifold is completed, further comprise program code that when executed causes the at least one processor to:

determine a first duration of time elapsed from the initiation of the filling the secondary fuel manifold.

20. The non-transitory computer readable medium of claim 17, wherein: the program code that when executed causes the at least one processor to determine that the filling of the secondary fuel manifold is completed, further comprise program code that when executed causes the at least one processor to determine the measured value of the scheduling parameters is no longer within the first range.

* * * * *